US012774427B2

(12) United States Patent
Kato et al.

(10) Patent No.: US 12,774,427 B2
(45) Date of Patent: Oct. 27, 2026

(54) METHOD FOR SEPARATING AND QUANTIFYING SATURATED AND UNSATURATED DIALKYL KETONES

(71) Applicant: FUJI OIL CO., LTD., Osaka (JP)

(72) Inventors: Yutaka Kato, Izumisano (JP); Shimpei Watanabe, Tsukubamirai (JP)

(73) Assignee: FUJI OIL CO., LTD., Osaka (JP)

( * ) Notice: Subject to any disclaimer, the term of this patent is extended or adjusted under 35 U.S.C. 154(b) by 330 days.

(21) Appl. No.: 18/570,910

(22) PCT Filed: Jun. 30, 2022

(86) PCT No.: PCT/JP2022/026202

§ 371 (c)(1),
(2) Date: Dec. 15, 2023

(87) PCT Pub. No.: WO2023/282169

PCT Pub. Date: Jan. 12, 2023

(65) Prior Publication Data

US 2024/0301317 A1 Sep. 12, 2024

(30) Foreign Application Priority Data

Jul. 5, 2021 (JP) ................................ 2021-111386

(51) Int. Cl.

*B01J 20/288* (2006.01)
*B01J 20/292* (2006.01)
*C11B 3/10* (2006.01)
*G01N 30/88* (2006.01)
*G01N 30/02* (2006.01)

(52) U.S. Cl.

CPC ............... *C11B 3/10* (2013.01); *B01J 20/288* (2013.01); *B01J 20/292* (2013.01); *G01N 30/88* (2013.01); *B01J 2220/54* (2013.01); *B01J 2220/58* (2013.01); *G01N 2030/025* (2013.01); *G01N 2030/884* (2013.01)

(58) Field of Classification Search

CPC ......... C11B 3/10; B01J 20/288; B01J 20/292; B01J 2220/54; B01J 2220/58; G01N 30/88; G01N 2030/025; G01N 2030/884; G01N 30/50; B01D 15/08; B01D 15/36; B01D 15/361; B01D 15/362; B01D 15/363; B01D 15/365; B01D 15/3833; B01D 15/3842

See application file for complete search history.

(56) References Cited

U.S. PATENT DOCUMENTS 5,262,052 A * 11/1993 Rossiter ................. B01D 15/08 95/82
10,092,894 B2 * 10/2018 Brousmiche ....... B01J 20/28073
2002/0155541 A1 * 10/2002 Naughton .............. C12M 41/38 435/235.1
2019/0187108 A1 * 6/2019 Erdmann ............... G01N 30/68

FOREIGN PATENT DOCUMENTS

| | | | | |
|---|---|---|---|---|
| CN | 106153765 | | 11/2016 | |
| EP | 3 761 024 | | 1/2021 | |
| EP | 3761024 | A1 * | 1/2021 | ............ G01N 30/88 |
| JP | 2019-45466 | | 3/2019 | |
| JP | 2019-158536 | | 9/2019 | |
| WO | 2019/176750 | | 9/2019 | |
| WO | WO-2019167390 | A1 * | 9/2019 | ............ G01N 30/88 |

OTHER PUBLICATIONS

Leonard Sidisky et al, Temperature Dependence of Equivalent Chain Length Values on Capillary Columns of Different Polarity, published in Journal of High Resolution Chromatography, 1991. (Year: 1991).*
Escapenet English translation of publication CN106153765A, Nov. 23, 2016. (Year: 2016).*
Escapenet English translation of publication WO2019167390A1, Sep. 6, 2019. (Year: 2019).*
Angelo D'Archivio et al, Characterisation of Gas-Chromatographic Poly(Siloxane) Stationary Phases by Theoretical Molecular Descriptors and Prediction of McReynolds Constants, published in International Journal of Molecular Sciences, Apr. 29, 2019. (Year: 2019).*
Extended European Search Report issued Jun. 4, 2025 in European Patent Application No. 22837585.3.
International Search Report issued Sep. 13, 2022 in International (PCT) Application No. PCT/JP2022/026202, with English translation.
International Preliminary Report on Patentability issued Dec. 14, 2023 in International (PCT) Application No. PCT/JP2022/026202, with English translation.

(Continued)

*Primary Examiner* — Joseph W Drodge
(74) *Attorney, Agent, or Firm* — Wenderoth, Lind & Ponack, L.L.P.

(57) ABSTRACT

To provide a method for separating and quantifying saturated and unsaturated dialkyl ketones. (1) A method for separating and quantifying saturated and unsaturated dialkyl ketones, the method including quantifying a dialkyl ketone-containing sample by a gas chromatograph using a polar column, except a nonpolar column and a slightly polar column, the polar column having a polarity value of 440 or greater. (2) The method according to (1), wherein the polar column is a polar column with medium polarity or higher polarity, the polar column having a polarity value of 700 or greater. (3) The method of (2), wherein the polar column is a polar column with high polarity or higher polarity, the polar column having a polarity value of 1550 or greater. (4) The method according to (3), wherein a liquid phase of the polar column with high polarity or higher polarity is an ionic liquid column. (5) A method for producing a chemical transesterified oil and/or fat, including separating and quantitatively analyzing saturated and unsaturated dialkyl ketones in an oil and/or fat, using the method described in any one of (1) to (4).

3 Claims, 4 Drawing Sheets

(56) References Cited

OTHER PUBLICATIONS

Yun Zou et al., "Improving the Analysis of 37 Fatty Acid Methyl Esters", Agilent [online], pp. 1-8, (May 29, 2018), available at: https://www.chemagilent.com/appnote/pdf/low_5991-8706JAJP.pdf, with English abstract and translation.
Katherin K. Stenerson et al., "Ionic Liquid GC Column Option for the Analysis of Omega 3 and Omega 6 Fatty Acids", Sigma-Aldrich Application Note, pp. 1-6 (Jun. 11, 2021), available at: https://www.sigmaaldrich.com/JP/ja/technical-documents/technicalarticle/food-and-beverage-testing-and-manufacturing/chemicalanalysis-for-food-and-beverage/ilgc-omega-fattyacids.
Anita Lestido-Cardama et al., "Dialkylketones in Paperboard Food Contact Materials—Method of Analysis in Fatty Foods and Comparative Migration into Liquid Simulants Versus Foodstuffs", Molecules, vol. 25, No. 915, pp. 1-14 (2020).

* cited by examiner (Example 2) DB-17ms (Example 3) DB-WAX (Example 4) HR-SS-10

(EXAMPLE 5) SLB-IL60

METHOD FOR SEPARATING AND QUANTIFYING SATURATED AND UNSATURATED DIALKYL KETONES

TECHNICAL FIELD

The present invention relates to a method for separating and quantifying saturated and unsaturated dialkyl ketones.

BACKGROUND ART

Transesterification is a widespread process for altering the physicochemical properties of oils and/or fats by redistributing fatty acids to the glycerol backbone of triacylglycerols without altering the fatty acid composition.

This redistribution of fatty acids can be carried out non-stereoselectively by chemical catalysts such as sodium methoxide (chemical transesterification) or stereoselectively by lipases (enzymatic transesterification).

Chemical transesterification is widely used because it has higher productivity and lower investment cost and production cost than those of enzymatic transesterification. In recent years, with an increasing tendency to reduce trans fatty acids from edible oils and/or fats, manufacturers tend to shift to chemical transesterification more than before.

Changes in several components during chemical transesterification have been reported, resulting in the reduction in tocopherols and the formation of by-products such as fatty acid methyl esters, soaps, free fatty acids and partial acylglycerols.

Verhe et al. first reported that dialkylketones (DAKs) were found from unsaponifiable fractions of chemical transesterified oils and/or fats (Non-Patent Literature (NPL) 1).

Verhe et al. reported a mechanism for the formation of DAKs DAKs is characterized by having a central carbonyl and two long aliphatic side chains, and the length thereof depends on the fatty acids involved in a decarboxylation process (NPL 1).

DAKs have also been detected from extracts of paperboard in contact with foods, and this is considered to be caused since an alkyl ketene dimer (AKD) used in a waterproof paper producing process remains unreacted, and is affected by hydrolysis and subsequent decarboxylation (NPL 2).

Although the impact of DAKs on our health is not clear, the amount of these AKD-based DAKs is limited to less than 5 mg per kg of food by the German BfR and to less than 0.4 wt. % in paper or paperboard by the Food and Drug Administration (FDA).

AKD-based DAKs mainly include saturated chains, and commercial AKDs are mainly prepared from saturated fatty acids such as stearic acid and are therefore analyzed by a gas chromatograph (GC), a flame ionization detector (FID) and/or mass spectrometry (MS).

On the other hand, the analysis of DAKs in a chemical transesterified oil is not easier than the analysis of AKD-based DAKs because not only saturated DAKs but also unsaturated DAKs are contained in the chemical transesterified oil, and there is a need for an analysis method for separating and quantifying saturated and unsaturated DAKs.

For measurement and quantification of DAKs using a GC-FID system and identification thereof by a GC-MS system, Santoro et al. have reported the use of either GC-MS or liquid chromatography-high resolution MS.

In the GC-FID and MS analysis, a nonpolar or low-polar capillary column is used, and only saturated DAKs can be separated (NPL 3).

In addition, although Patent Documents 1 and 2 each describe a method for accurately quantifying dialkyl ketones in an oil and/or fat, the method is not a method for separating and quantifying saturated and unsaturated dialkyl ketones.

However, it is considered to be difficult to separate and quantify all DAK species by the methods proposed in the related art, because DAKs contained, especially, in processed oils and/or fats are similar in structural and physical properties.

As reported by other researchers, when DAKs are identified and quantified using an MS system, the quantification in the MS system is less accurate than an FID system because of instable ionization.

Thus, in order to ensure high quantitativity, it is necessary to perform two analyses for identification by the MS system and for quantification by the FID system.

Therefore, there is a need for a GC-FID system with high efficiency and high separation performance to enable separation and quantification of DAKs in a single analysis.

CITATION LIST

Patent Documents

Patent Document 1: JP 2019-045466 A

Patent Document 2: JP 2019-158536 A Non-Patent Literatures

NPL 1: Verhe, R.; Van Hoed, V.; De Greyt, W. "Detection of alkyl ketones during chemical interesterification of lipids." In Proceedings of the Paper Presented at 97th AOCS Annual Meeting & Expo, St-Louis, MO, USA, 3 May 2006.

NPL 2: Lestido-Cardama, A.; Stormer, A.; Franz, R. "Dialkylketones in paperboard food contact materials-method of analysis in fatty foods and comparative migration into liquid simulants versus foodstuffs." Molecules. 25(4), 915-928 (2020).

NPL 3: Santoro, V.; Baiocchi, C.; Bello, D. F.; Gastaldi, D.; Aigotti, R.; Zorzi, M; Pellegrino, A.; Forte, E.; Romaniello, F.; Magni, M.; Fontana, M.; Somenzi, M.; Medana, C. "Formation of by-products during chemical interesterification of lipids. Detection and characterization of dialkyl ketones by non-aqueous reversed-phase liquid chromatography-high resolution mass spectrometry and gas chromatography-mass spectrometry." J. Chromatogr. A 1581-1582, 63-70 (2018).

SUMMARY OF INVENTION

Technical Problem

An object of the present invention is to provide a method for separating and quantifying saturated and unsaturated dialkyl ketones.

Solution to Problem

As a result of intensive studies to solve the above issues, the present inventors have found that saturated and unsaturated dialkyl ketones can be separated and quantified by using a polar column except a nonpolar column and a slightly polar column, and have completed the present invention.

That is, the present invention includes the following inventions.

(1) A method for separating and quantifying saturated and unsaturated dialkyl ketones, the method including quantifying a dialkyl ketone-containing sample by a gas chromatograph using a polar column, except a nonpolar column and a slightly polar column, the polar column having a polarity value of 440 or greater.

(2) The method according to (1), wherein the polar column is a polar column with medium polarity or higher polarity, the polar column having a polarity value of 700 or greater.

(3) The method of (2), wherein the polar column is a polar column with high polarity or higher polarity, the polar column having a polarity value of 1550 or greater.

(4) The method according to (3), wherein a liquid phase of the polar column with high polarity or higher polarity is an ionic liquid column.

(5) A method for producing a chemical transesterified oil and/or fat, including separating and quantitatively analyzing saturated and unsaturated dialkyl ketones in an oil and/or fat, using the method described in any one of (1) to (4).

Advantageous Effects of Invention

According to the method of the present invention, it is possible to separate and quantify saturated and unsaturated dialkyl ketones in a single analysis.

DESCRIPTION OF EMBODIMENTS

Figure 1:
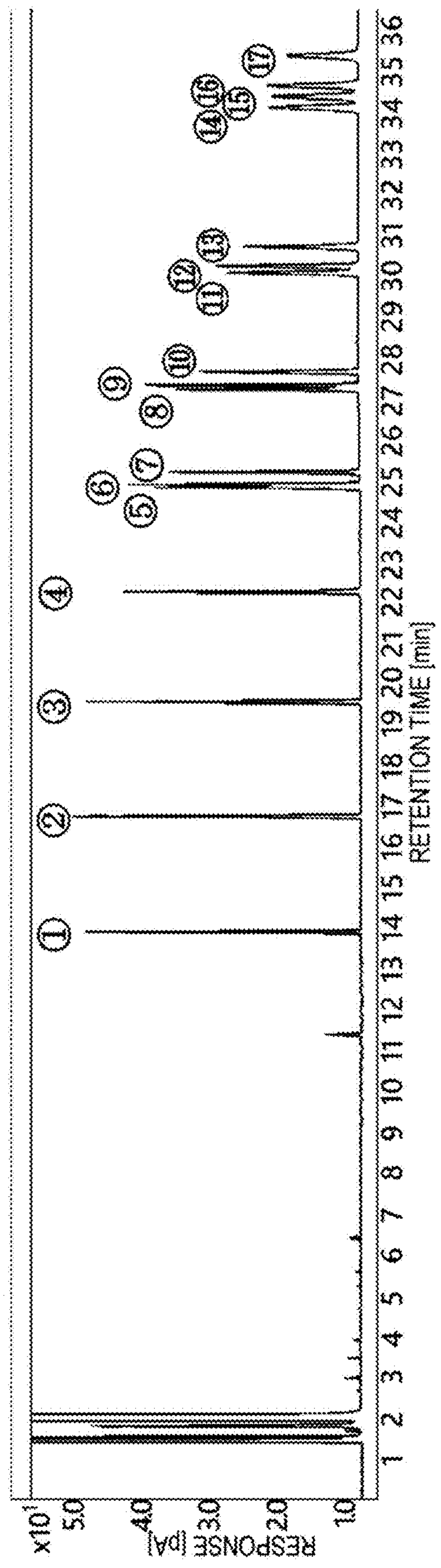
FIG. 1 is the separation of 17 DAK mixtures of Example 2 having the following polar column: DB-17 ms (length: 30 m, internal diameter: 0.25 mm ID, membrane thickness: 0.25 m, medium polar column, polarity value: about 948, liquid phase: 50% diphenyl-50% dimethylpolysiloxane/available from Agilent).

The present invention is directed to a method for separating and quantifying saturated and unsaturated dialkyl ketones, including quantifying a dialkyl ketone-containing sample by a gas chromatograph using a polar column, except a nonpolar column and a slightly polar column, the polar column having a polarity value of 440 or greater. The present invention will be described in detail below.

Dialkyl Ketone-Containing Sample

In the method of the present invention, various samples such as oils and/or fats used in foods or food raw materials or extracts of waterproof paper in contact with foods can be used as the dialkyl ketone-containing sample.

Among these samples, the method can be preferably used in analysis of edible oils and/or fats, particularly chemical transesterified oils and/or fats containing saturated and unsaturated dialkyl ketones.

It is also possible to extract and purify hydrophobic fractions from foods using chemical transesterified oils and/or fats or the like, for example, water-in-oil emulsions such as confectioneries, chocolates and margarines, oil-in-water emulsions such as fillings, whip creams and dressings, and beverages by an ordinary method, and analyze them.

Polar Column Except Nonpolar Column and Slightly Polar Column

The method of the present invention is characterized by using a polar column, except a nonpolar column and a slightly polar column, having a polarity value of 440 or greater, when quantifying a dialkyl ketone-containing sample by a gas chromatograph. The use of a polar column having a polarity value of 440 or greater enables separation and quantification of saturated and unsaturated dialkyl ketones.

Examples of the nonpolar column and the slightly polar column include columns in which the liquid phase is 100% dimethylpolysiloxane, 5% diphenyl-dimethylpolysilphenylenesiloxane, 5% diphenyl-95% dimethylpolysiloxane, and 14% diphenyl-86% dimethylpolysiloxane, and specific examples thereof can include DB-1, HP-1, Rtx-1, CP-Sil5CB, SPB-1, InertCap1MS, InertCap1HP-5 ms, Rxi-5 ms, Equity-5, Rtx-5MS, DB-5 ms, Rxi-5SilMS, VF-5 ms, SLB-5 ms, InertCap5MS/Sil, InertCap5MS/NP, InertCap5, DB-5, HP-5, Rtx-5, CP-Sil8CB, SPB-5, and DB-XLB.

Polarity Value

In the present invention, the polarity of the column is medium polarity or higher polarity, and the polar column is characterized by having a polarity value of 440 or greater, and preferably has a polarity value of preferably 700 or greater, and more preferably 1550 or greater. The polarity value is a value indicating the total sum of McReynolds numbers of five kinds of compounds (benzene, n-butanol, 2-pentanone, nitropropane, and pyridine) in the column. The McReynolds number represents a difference between a value of Kovats Index on a squalane stationary phase column and a value of Kovats Index in a liquid phase, for a compound.

Examples of the medium polar column having a polarity value of from about 440 to about 1550 include a column in which the liquid phase is 20% diphenyl-80% dimethylpolysiloxane, a column in which the liquid phase is 35% diphenyl-65% dimethylpolysiloxane, a column in which the liquid phase is 50% diphenyl-50% dimethylpolysiloxane, a column in which the liquid phase is 6% cyanopropylphenyl-94% dimethylsiloxane, a column in which the liquid phase is 14% cyanopropylphenyl-86% dimethylsiloxane, a column in which the liquid phase is 50% diphenyl-50% dimethylsilphenylenesiloxane, and a column in which the liquid phase is 50% trifluoropropyl-50% methylpolysiloxane, and specific examples thereof can include InertCap35MS, InertCap25, DB-35msUI, VF-35 ms, Rxi-35silMS, InertCap624, DB-624, HP-VOC, Rtx-624, VF-624 ms, InertCap624MS, DB-624, HP-VOC, Rtx-624, Rxi-624SilMS, VF-624 ms, InertCap1301, DB-1301, HP-1301, Rtx-1301, VF-1301ms, InertCap25, DB-35 ms, DB-35, HP-35 ms, HP-35, Rtx-35, VF-35 ms, InertCap35, VF-1701 ms, InertCap1701MS, InertCap1701, DB-1701, Rtx-1701, VF-1701 ms, SPB-1701, InertCap17MS/Sil, DB-17MS, VF-17 ms, Rxi-17silMS, InertCap17MS, DB-17 ms, Rxi-17SilMS, VF-17 ms, InertCap17, DB-17, HP-50, Rtx-50, CP-Sil24CB, SPB-50, InertCap210, DB-210, Rtx-200, and VF-200 ms.

Among them, examples of the medium polar column having a polarity value of 700 or greater include a column in which the liquid phase is 14% cyanopropylphenyl-86% dimethylsiloxane, a column in which the liquid phase is 35% diphenyl-65% dimethylpolysiloxane, a column in which the liquid phase is 50% diphenyl-50% dimethylpolysiloxane, a column in which the liquid phase is 50% diphenyl-50% dimethylsilphenylenesiloxane, and a column in which the liquid phase is 50% trifluoropropyl-50% methylpolysiloxane.

Further, in the method of the present invention, the polarity of the column is most preferably high polarity or higher polarity, and the polarity value is preferably 1550 or greater.

Examples of the highly polar column having a polarity value of 1550 or greater include a column in which the liquid phase is polyethylene glycol, a column in which the liquid phase is nitroterephthalic acid-modified polyethylene glycol, a column in which the liquid phase is 50% cyanopropylmethyl-50% phenyl-methylpolysiloxane, a column in which the liquid phase is 50% cyanopropylphenyl-50% dimethylsiloxane, a column in which the liquid phase is nitrile silicone, a column in which the liquid phase is 70% Cyanopropyl-Silphenylene siloxane, a column in which the liquid phase is poly(biscyanopropyl siloxane, proprietary phase, poly (80% biscyanopropyl/20% cyanopropylphenyl siloxane) phase, a column in which the liquid phase is 1,12-Di(tripropylphosphonium)dodecane bis(trifluoromethylsulfonyl)imide, a column in which the liquid phase is 1,12-Di(tripropylphosphonium)dodecane bis(trifluoromethylsulfonyl)imide, a column in which the liquid phase is 1,12-Di(tripropylphosphonium)dodecane bis(trifluoromethylsulfonyl)imide trifluoromethylsulfonate, a column in which the liquid phase is Tri(tripropylphosphoniumhexanamido)triethylamine bis(trifluoromethylsulfonyl)imide, a column in which the liquid phase is 1,12-Di(2,3-dimethylimidazolium)dodecane bis(trifluoromethylsulfonyl)imide, a column in which the liquid phase is 1,9-Di(3-vinylimidazolium)nonane bis(trifluoromethylsulfonyl)imide, and a column in which the liquid phase is 1,5-Di(2,3-dimethylimidazolium)pentane bis(trifluoromethylsulfonyl)imide, and specific examples thereof can include InertCap Pure-WAX, DB-WAX, HP-INNOWax, Rtx-Wax, Stabilwax, InertCap WAX-HT, DB-WAXetr, SolGel-WAX, InertCap FFAP, DB-FFAP, HP-FFAP, CP-WAX 58(FFAP)CB, HR-SS-10, PAG, SPB-225, InertCap 225, DB-225, Rtx-225, CP-Sil 43CB, SP-2330, TC-70, SP-2330, SP-2331, SP-2560, SLB-IL59, SLB-IL60, SLB-IL61, SLB-IL82, SLB-IL100, and SLB-IL111.

In the present invention, when the highly polar column is further most preferably an ionic liquid column, the saturated and unsaturated dialkyl ketones in the sample can be well separated from each other and more accurately quantified.

Examples of the ionic liquid column include a column in which the liquid phase is 1,12-Di(tripropylphosphonium) dodecane bis(trifluoromethylsulfonyl)imide, a column in which the liquid phase is 1,12-Di(tripropylphosphonium) dodecane bis(trifluoromethylsulfonyl)imide, a column in which the liquid phase is 1,12-Di(tripropylphosphonium) dodecane bis(trifluoromethylsulfonyl)imide trifluoromethylsulfonate, a column in which the liquid phase is Tri (tripropylphosphoniumhexanamido)triethylamine bis (trifluoromethylsulfonyl)imide, a column in which the liquid phase is 1,12-Di(2,3-dimethylimidazolium)dodecane bis(trifluoromethylsulfonyl)imide, a column in which the liquid phase is 1,9-Di(3-vinylimidazolium)nonane bis(trifluoromethylsulfonyl)imide, and a column in which the liquid phase is 1,5-Di(2,3-dimethylimidazolium)pentane bis(trifluoromethylsulfonyl)imide, and specific examples thereof can include SLB-IL59, SLB-IL60, SLB-IL61, SLB-IL82, SLB-IL100, and SLB-IL111.

Gas Chromatograph

In the method of the present invention, a gas chromatograph is used, and a commonly used gas chromatograph can be used as the gas chromatograph. Measurement conditions can be appropriately set so that saturated and unsaturated dialkyl ketones can be separated and quantified using the column described above.

For a detector and the like used in the gas chromatograph, commonly used ones can be used, and examples of the detector include a mass spectrometer (MS) and a flame ionization detector (FID).

EXAMPLES

The present invention will be described in more detail below by way of examples, but is not limited to these examples.

In describing the details of the present invention, the following columns were used for comparison:

(Comparative Example 1) HP-1MS UI (length: 30 m, internal diameter: 0.25 mm ID, membrane thickness: 0.25 μm, nonpolar column, polarity value: about 130, liquid phase: 100% dimethylpolysiloxane/available from Agilent)

(Comparative Example 2) HP-5MS UI (length: 30 m, internal diameter: 0.25 mm ID, membrane thickness: 0.25 μm, slightly polar column, polarity value: about 252, liquid phase: 5% diphenyl-95% dimethylpolysiloxane/available from Agilent)

(Comparative Example 3) DB-XLB (length: 30 m, internal diameter: 0.25 mm ID, membrane thickness: 0.25 μm, slightly polar column, polarity value: about 300, liquid phase: 14% diphenyl-86% dimethylpolysiloxane/available from Agilent)

(Example 1) InertCap 1701 (length: 30 m, internal diameter: 0 25 mm ID, membrane thickness: 0.25 μm, medium polar column, polarity value: about 700, liquid phase: 14% cyanopropylphenyl-86% dimethylsiloxane/available from GL Science)

(Example 2) DB-17 ms (length: 30 m, internal diameter: 0.25 mm ID, membrane thickness: 0.25 μm, medium polar column, polarity value: about 948, liquid phase: 50% diphenyl-50% dimethylpolysiloxane/available from Agilent)

(Example 3) DB-WAX (length: 30 m, internal diameter: 0.25 mm ID, membrane thickness: 0.25 μm, highly polar column, polarity value: about 2324, liquid phase: polyethylene glycol/available from Agilent)

(Example 4) HR-SS-10 (length: 25 m, internal diameter: 0.25 mm ID, highly polar column, polarity value: about 2500, liquid phase: nitrile silicone/available from Shinwa Chemical Industries Ltd.)

(Example 5) SLB-IL60 (length: 30 m, internal diameter: 0.25 mm ID, thickness: 0.2 μm, highly polar column, polarity value: about 2622, liquid phase: 1,12-Di (tripropylphosphonium)dodecane bis(trifluoromethylsulfonyl)imide/available from Supelco)

(Analysis Example 1) Separation and Analysis of Unsaturated DAKs

Adjustment of Sample

For nine unsaturated DAK synthetic products (C11-CO-C17:1, C11-CO-C17:2, C13-CO-C17:1, C13-CO-C17:2, C15-CO-C17:1, C15-CO-C17:2, C17-CO-C17:1, C17:1-CO-C17:1, C17:1-CO-C17:2), each of the unsaturated DAK synthetic products was dissolved in a mixed solution of toluene and hexane so as to attain a concentration of 125 ppm, and the solution was subjected to GC.

DAKs are expressed so as to represent their chemical structures. For example, DAKs produced from two molecules of steric acid (C18) is expressed as C17-CO-C17 (18-pentatriacontanone), and DAKs produced from two molecules of oleic acid (C18:1) is expressed as C17:1-CO-C17:1 (pentatriacontane-9,26-dien-18-one). This notation is used hereinafter.

Analysis Conditions for GC

GC system: Agilent GC 7890B

Column:

(Comparative Example 1) HP-1MS UI (30 m×0.25 mm, 0.25 μm)

(Comparative Example 2) HP-5MS UI (30 m×0.25 mm, 0.25 μm)

(Comparative Example 3) DB-XLB (30 m×0.25 mm, 0.25 μm)

(Example 1) InertCap 1701 (30 m×0.25 mm, 0.25 μm)

(Example 5) SLB-IL60 (30 m×0.25 mm, 0.2 μm)

Injection port: 300° C., split mode, split ratio=25:1

Carrier gas: helium gas constant linear velocity mode, 38 cm/s

Oven: 80° C. (retained for 1 min)→200° C. (not retained, 25° C./min)→290° C. (retained for 30 min, 5° C./min)

FID temperature: 340° C.

Injection volume: 1 μL

The separation of unsaturated DAKs was confirmed based on the number of peaks on the chromatogram obtained in the analysis. The results are listed in Table 1.

TABLE 1

| | Column | Polarity | Separation of unsaturated DAKs |
|---|---|---|---|
| Comparative Example 1 | HP-1MS UI | Nonpolarity | Was not able to be separated. |
| Comparative Example 2 | HP-5MS UI | Slight polarity | Was not able to be separated. |
| Comparative Example 3 | DB-XLB | Slight polarity | Was not able to be separated. |
| Example 1 | InertCap 1701 | Medium polarity | Separated |
| Example 5 | SLB-IL60 | High polarity | Separated |

In the case of using a nonpolar column (HP-1MS UI) or a slightly polar column (HP-5MS UI, DB-XLB) used in analysis of DAKs in the related art, nine unsaturated DAKs were not able to be separated, but, in the case of using a medium polar column (InertCap 1701) or a highly polar column (SLB-IL60), unsaturated DAKs were able to be separated.

(Analysis Example 2) Separation and Analysis of DAKs

Adjustment of Sample

For seventeen DAK synthetic products (C10-CO-C10, C11-CO-C11, C11-CO-C13, C11-CO-C15, C11-CO-C17, C11-CO-C17:1, C11-CO-C17:2, C15-CO-C15, C13-CO-C17:1, C13-CO-C17:2, C15-CO-C17, C15-CO-C17:1, C15-CO-C17:2, C17-CO-C17, C17-CO-C17:1, C17:1-CO-C17:1, C17:1-CO-C17:2), each of the DAK synthetic products was dissolved in a mixed solution of toluene and hexane so as to attain a concentration of 118 ppm, and the solution was subjected to GC.

Analysis Conditions for GC

GC system: Agilent GC 7890B

Column:

(Example 2) DB-17 ms (30 m×0.25 mm, 0.25 μm)

(Example 3) DB-WAX (30 m×0.25 mm, 0.25 μm)

(Example 4) HR-SS-10 (25 m×0.25 mm)

(Example 5) SLB-IL60 (30 m×0.25 mm, 0.2 μm)

Injection port: 300° C., split mode, split ratio=25:1

Carrier gas: helium gas constant linear velocity mode, 38 cm/s

Oven:

DB-17 ms, SLB-IL60

80° C. (retained for 1 min)→180° C. (not retained, 25° C./min)→290° C. (retained for 30 min, 5° C./min)

DB-WAX

80° C. (retained for 1 min)→180° C. (not retained, 25° C./min)→245° C. (retained for 30 min, 5° C./min)

HR-SS-10

80° C. (retained for 1 min)→180° C. (not retained, 25° C./min)→+220° C. (retained for 30 min, 5° C./min)

FID temperature: 340° C.

Injection volume: 1 μL

Figure 2:
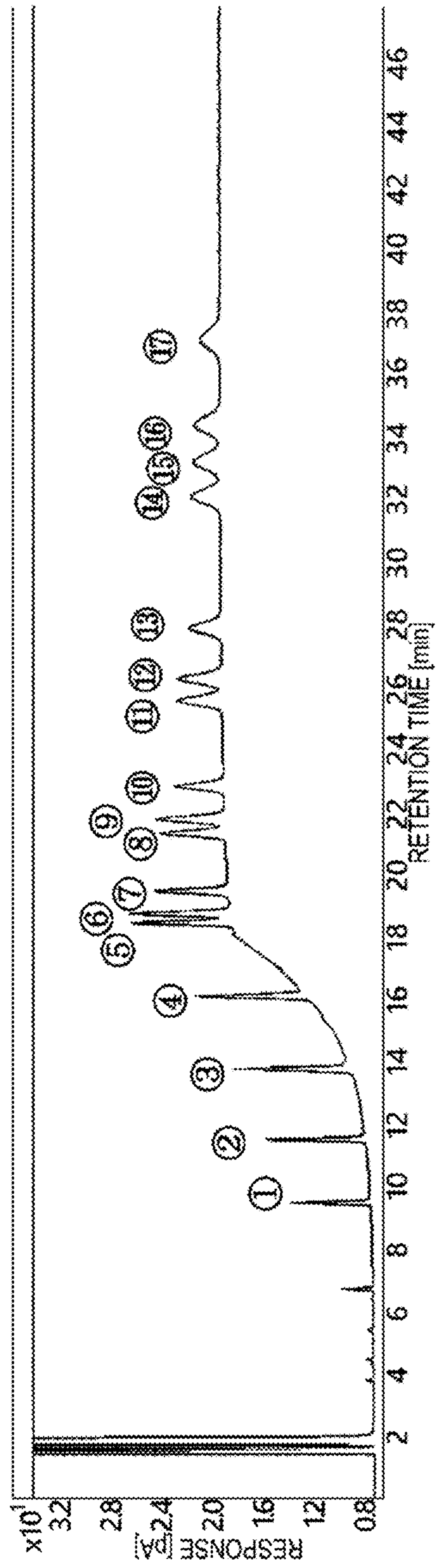
FIG. 2 is the separation of 17 DAK mixtures of Example 3 having the following polar column: DB-WAX (length: 30 m, internal diameter: 0.25 mm ID, membrane thickness: 0.25 μm, highly polar column, polarity value: about 2324, liquid phase: polyethylene glycol/available from Agilent).
Figure 3:
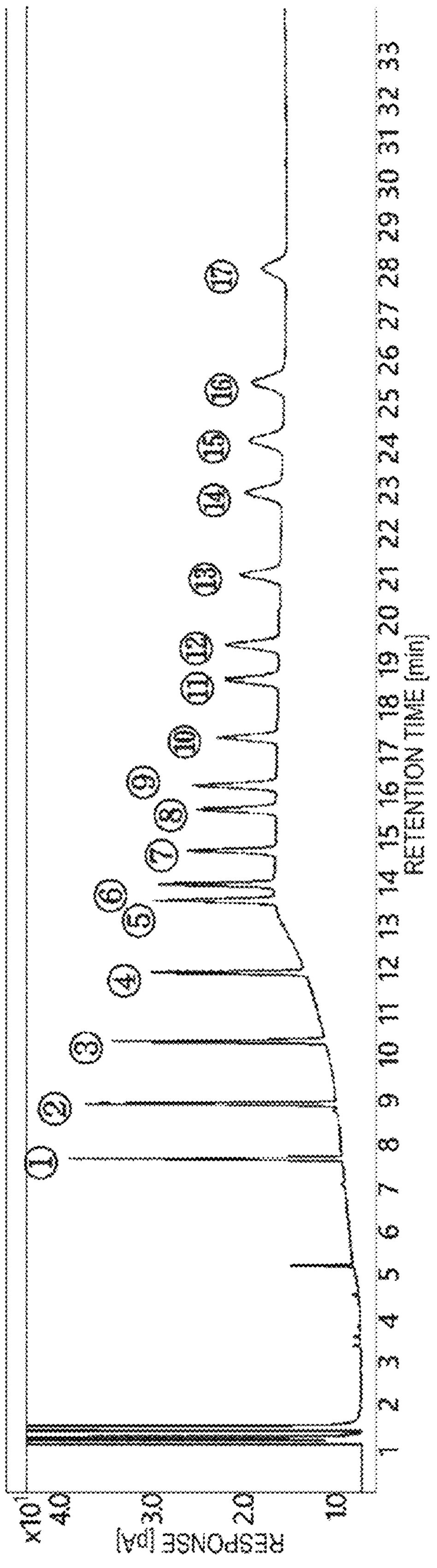
FIG. 3 is the separation of 17 DAK mixtures of Example 4 having the following polar column: HR-SS-10 (length: 25 m, internal diameter: 0.25 mm ID, highly polar column, polarity value: about 2500, liquid phase: nitrile silicone/available from Shinwa Chemical Industries Ltd.).
Figure 4:
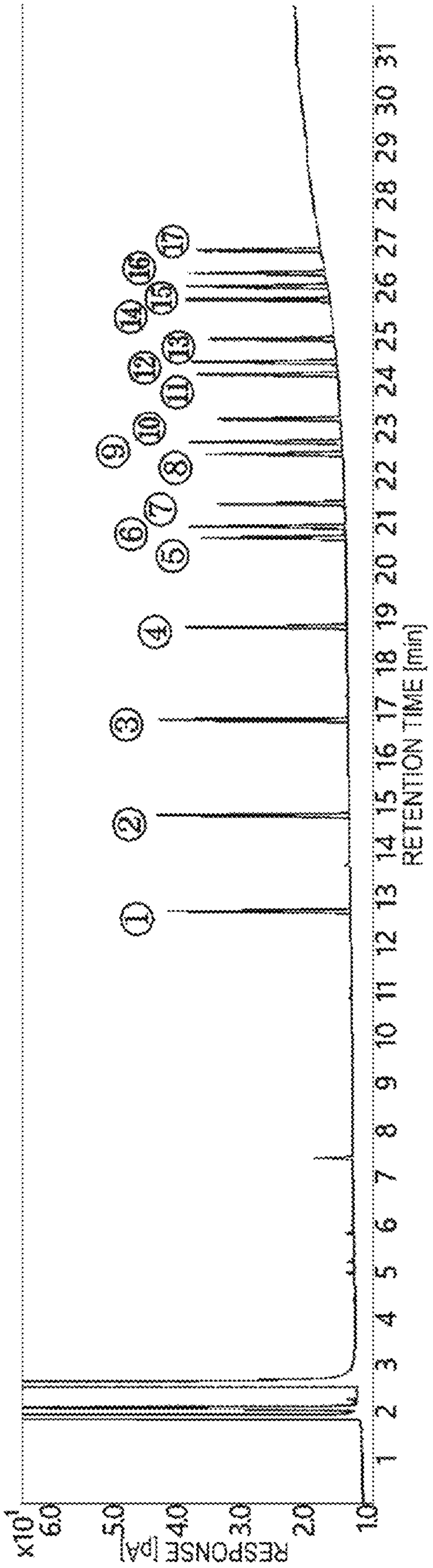
FIG. 4 is the separation of 17 DAK mixtures of Example 5 having the following polar column: SLB-IL60 (length: 30 m, internal diameter: 0.25 mm ID, thickness: 0.2 μm, highly polar column, polarity value: about 2622, liquid phase: 1,12-Di(tripropylphosphonium)dodecane bis(trifluoromethylsulfonyl)imide/available from Supelco).

The separation of the 17 DAK mixtures was confirmed on various polar columns. The results are listed in FIGS. 1-4.

As shown by the results, it was possible to separate and analyze saturated and unsaturated DAKs by using a medium polar column and a highly polar column.

(Analysis Example 3) Quantitative Analysis of DAKs Using Highly Polar Column SLB-IL60

Example 5

Adjustment of Sample

For sixteen DAK synthetic products (C11-CO-C11, C11-CO-C13, C11-CO-C15, C11-CO-C17, C11-CO-C17:1, C11-CO-C17:2, C15-CO-C15, C13-CO-C17:1, C13-CO-C17:2, C15-CO-C17, C15-CO-C17:1, C15-CO-C17:2, C17-CO-C17, C17-CO-C17:1, C17:1-CO-C17:1, C17:1-CO-C17:2), each of the DAK synthetic products was dissolved in a mixed solution of toluene and hexane so as to attain a concentration of from 0.2 to 250 ppm. In total, six types of solutions in concentration were subjected to GC, respectively.

Analysis Conditions for GC

GC system: Agilent GC 7890B

Column: SLB-IL60 (30 m×0.25 mm, 0.2 μm)

Injection port: 300° C., split mode, split ratio=25:1

Carrier gas: helium gas constant linear velocity mode, 38 cm/s

Oven: 80° C. (retained for 1 min)→180° C. (not retained, 25° C./min)→290° C. (retained for 30 min, 5° C./min)

FID temperature: 340° C.

Injection volume: 1 μL

Processing of Analysis Data

OpenLab CDS software (version 2.5) available from Agilent was used in processing of the resulting chromatogram. That is, a calibration curve of the peak area provided by peak picking and the injection concentration was created, and a square value (R2) of a correlation coefficient R and slope and intercept of the calibration curve were calculated. A detection limit (LOD) and a lower limit of quantification (LOQ) were calculated as concentrations at which the SN ratio was 3 and 10, respectively. The results are listed in Table 2.

TABLE 2

| DAKs | RT (min.) | R2 | Slope | Intercept | LOD (ppm) | LOQ (ppm) |
|---|---|---|---|---|---|---|
| C11-CO-C10 | 12.645 | | | | | |
| C11-CO-C11 | 14.699 | 0.9998 | 0.5605 | 0.6690 | 0.14 ± 0.03 | 0.45 ± 0.09 |
| C11-CO-C13 | 16.732 | 0.9997 | 0.6955 | 0.6651 | 0.13 ± 0.02 | 0.42 ± 0.08 |
| C11-CO-C15 | 18.731 | 0.9997 | 0.5107 | 0.7081 | 0.15 ± 0.02 | 0.51 ± 0.05 |
| C11-CO-C17 | 20.612 | 0.9997 | 0.5662 | 0.5834 | 0.16 ± 0.01 | 0.53 ± 0.04 |
| C11-CO-C17:1 | 20.868 | 0.9997 | 0.5122 | 0.6860 | 0.18 ± 0.01 | 0.59 ± 0.03 |
| C11-CO-C17:2 | 21.336 | 0.9997 | 0.5113 | 0.5279 | 0.18 ± 0.03 | 0.61 ± 0.10 |
| C15-CO-C15 | 22.417 | 0.9997 | 0.4590 | 0.6261 | 0.21 ± 0.02 | 0.69 ± 0.05 |
| C13-CO-C17:1 | 22.651 | 0.9997 | 0.6078 | 0.5973 | 0.15 ± 0.01 | 0.50 ± 0.05 |
| C13-CO-C17:2 | 23.162 | 0.9997 | 0.4300 | 0.5605 | 0.23 ± 0.01 | 0.75 ± 0.04 |
| C15-CO-C17 | 24.096 | 0.9998 | 0.5673 | 0.4850 | 0.14 ± 0.01 | 0.47 ± 0.04 |
| C15-CO-C17:1 | 24.38 | 0.9998 | 0.4918 | 0.5827 | 0.19 ± 0.13 | 0.64 ± 0.10 |
| C15-CO-C17:2 | 24.843 | 0.9998 | 0.5367 | 0.4746 | 0.20 ± 0.02 | 0.65 ± 0.08 |
| C17-CO-C17 | 25.719 | 0.9998 | 0.5189 | 0.5639 | 0.21 ± 0.03 | 0.71 ± 0.10 |
| C17-CO-C17:1 | 25.974 | 0.9999 | 0.5819 | 0.3801 | 0.23 ± 0.02 | 0.75 ± 0.06 |
| C17:1-CO-C17:1 | 26.277 | 0.9998 | 0.4907 | 0.5076 | 0.40 ± 0.14 | 1.34 ± 0.47 |
| C17:1-CO-C17:2 | 26.739 | 0.9998 | 0.5363 | 0.3852 | 0.45 ± 0.03 | 1.54 ± 0.11 |

*Values of LOD and LOQ were means ± S.D. (n = 3)

As shown in Table 2, a highly correlated calibration curve (R2>0.999) was able to be created, and a low LOD value (>0.46 ppm) and a low LOQ value (>1.54 ppm) were calculated, demonstrating that this method is a technique having high quantitativity.

(Example 4) Addition Recovery Test

Adjustment of Sample

For sixteen DAK synthetic products (C11-CO-C11, C11-CO-C13, C11-CO-C15, C11-CO-C17, C11-CO-C17:1, C11-CO-C17:2, C15-CO-C15, C13-CO-C17:1, C13-CO-C17:2, C15-CO-C17, C15-CO-C17:1, C15-CO-C17:2, C17-CO-C17, C17-CO-C17:1, C17:1-CO-C17:1, C17:1-CO-C17:2) each of the DAK synthetic products was dissolved in a mixed solution of toluene and hexane, and the solution was added to palm refined oil free of DAKs (available from Fuji Oil Co., Ltd.) so as to attain a final concentration of 50 mg/kg oil. The adjusted samples were used.

Before being subjected to GC, the sample was subjected to the following pretreatment for extraction and purification.

Pretreatment

To 2 g of the sample, the internal standard substance (C10-CO-C10) was added so as to attain a final concentration of 100 ppm, and 12 mL of ethanol and 2 mL of a 50% KOH aqueous solution were added. The mixture was heated at about 80° C. for 1 hour, and subjected to a saponification reaction. After cooling, 10 mL of distilled water was added, extraction was performed three times with petroleum ether, and the recovered petroleum ether fraction was washed three times with 10% ethanol-water. The petroleum ether layer was dehydrated with sodium sulfate. Then, the solvent of the filtrate was distilled off, followed by re-dissolution with hexane, the whole amount was passed through a silica gel column (Supelco, Discovery DSC-Si SPE Tube bed wt. 2 g, volume 12 mL) conditioned with hexane, and the DAKs were eluted with 15 mL of hexane/ether (95/5 v/v). After the solvent of the resulting fraction was distilled off, the residue was dissolved in a mixed solution of toluene and hexane, and the solution was subjected to GC.

Analysis Conditions for GC

GC system: Agilent GC7890B

Column: SLB-IL60 (Example 4) (30 m×0.25 mm, 0.2 μm)

Injection port: 300° C., split mode, split ratio=25:1

Carrier gas: helium gas constant linear velocity mode, 38 cm/s

Oven: 80° C. (retained for 1 min)→180° C. (not retained, 25° C./min)→290° C. (retained for 30 min, 5° C./min)

FID temperature: 340° C.

Injection volume: 1 μL

After the analysis result of the sample was corrected with the internal standard, the amounts of the DAKs were quantified using the calibration curve created in Example 3, and a recovery rate was calculated in percentage (%) from comparison with theoretical values of the amounts added. The results are listed in Table 3.

TABLE 3

| DAKs | RT (min) | R2 | Slope | Inter-cept | LOD (ppm) | LOQ (ppm) |
|---|---|---|---|---|---|---|
| C10-C0-C10 | 12.645 | | | | | |
| C11-C0-C11 | 14.699 | 0.9998 | 0.5605 | 0.6609 | 0.14 ± 0.03 | 0.45 ± 0.09 |
| C11-C0-C13 | 16.732 | 0.9997 | 0.6955 | 0.6651 | 0.13 ± 0.02 | 0.42 ± 0.08 |
| C11-C0-C15 | 18.734 | 0.9997 | 0.5107 | 0.7081 | 0.15 ± 0.02 | 0.51 ± 0.05 |
| C11-C0-C17 | 20.612 | 0.9997 | 0.6662 | 0.6834 | 0.16 ± 0.01 | 0.53 ± 0.01 |
| C11-C0-C17:1 | 20.868 | 0.9997 | 0.5122 | 0.6860 | 0.18 ± 0.01 | 0.59 ± 0.03 |
| C11-C0-C17:2 | 21.336 | 0.9997 | 0.5113 | 0.6279 | 0.18 ± 0.03 | 0.61 ± 0.10 |

TABLE 3-continued

| DAKs | RT (min) | R2 | Slope | Inter-cept | LOD (ppm) | LOQ (ppm) |
|---|---|---|---|---|---|---|
| C15-C0-C15 | 22.417 | 0.9997 | 0.4690 | 0.6261 | 0.21 ± 0.02 | 0.69 ± 0.05 |
| C13-C0-C17:1 | 22.651 | 0.9997 | 0.6078 | 0.6973 | 0.15 ± 0.01 | 0.50 ± 0.05 |
| C13-C0-C17:2 | 23.162 | 0.9997 | 0.4300 | 0.6605 | 0.23 ± 0.01 | 0.75 ± 0.04 |
| C15-C0-C17 | 24.096 | 0.9998 | 0.5673 | 0.4850 | 0.14 ± 0.01 | 0.47 ± 0.04 |
| C15-C0-C17:1 | 24.38 | 0.9998 | 0.4918 | 0.5827 | 0.19 ± 0.13 | 0.64 ± 0.10 |
| C15-C0-C17:2 | 24.843 | 0.9998 | 0.5367 | 0.4746 | 0.20 ± 0.02 | 0.65 ± 0.08 |
| C17-C0-C17 | 25.719 | 0.9998 | 0.5189 | 0.5639 | 0.21 ± 0.03 | 0.71 ± 0.10 |
| C17-C0-C17:1 | 25.974 | 0.9999 | 0.5819 | 0.3801 | 0.23 ± 0.02 | 0.75 ± 0.06 |
| C17:1-C0-C17:1 | 26.277 | 0.9998 | 0.4907 | 0.5076 | 0.40 ± 0.14 | 1.34 ± 0.47 |
| C17:1-C0-C17:2 | 26.739 | 0.9998 | 0.5363 | 0.3832 | 0.45 ± 0.03 | 1.54 ± 0.11 |

*Values of LOD and LOQ were mcans ± S. D. (n = 3)

As a result, high recovery rates of from 101% to 104% were provided, indicating that the developed method has both high quantitativity and practicability.

The invention claimed is:

1. A method for separating and quantifying saturated and unsaturated dialkyl ketones, the method comprising quantifying a dialkyl ketone-containing sample by a gas chromatograph using a polar column having a polarity value of 1550 or greater, wherein the polarity value indicates a total sum of McReynolds numbers of benzene, n-butanol, 2-pentanone, nitropropane and pyridine in the polar column.

2. The method according to claim 1, wherein a liquid phase of the polar column is an ionic liquid.

3. A method for producing a chemical transesterified oil and/or fat, comprising separating and quantitatively analyzing the saturated and unsaturated dialkyl ketones in the oil and/or fat, using the method according to claim 1.

* * * * *